United States Patent
Young et al.

(10) Patent No.: US 11,171,995 B2
(45) Date of Patent: Nov. 9, 2021

(54) IDENTIFYING AND MITIGATING RISKS OF CRYPTOGRAPHIC OBSOLESCENCE

(71) Applicant: EMC IP Holding Company LLC, Hopkinton, MA (US)

(72) Inventors: Eric Young, Annerley (AU); Zulfikar A. Ramzan, Saratoga, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 440 days.

(21) Appl. No.: 16/257,426

(22) Filed: Jan. 25, 2019

(65) Prior Publication Data
US 2020/0244706 A1 Jul. 30, 2020

(51) Int. Cl.
*H04L 29/00* (2006.01)
*H04L 29/06* (2006.01)
*G06Q 10/06* (2012.01)

(52) U.S. Cl.
CPC ..... *H04L 63/205* (2013.01); *G06Q 10/06393* (2013.01); *H04L 63/1433* (2013.01)

(58) Field of Classification Search
CPC . G06Q 10/06393; H04L 63/205; H04L 63/20; H04L 63/1433
See application file for complete search history.

(56) References Cited

U.S. PATENT DOCUMENTS

| 7,380,120 B1 * | 5/2008 | Garcia | G06F 21/60 713/160 |
| 7,813,822 B1 * | 10/2010 | Hoffberg | H04N 21/44222 700/94 |
| 8,352,725 B1 * | 1/2013 | O'Toole, Jr. | H04L 63/20 713/151 |

(Continued)

OTHER PUBLICATIONS

V. Mavroeidis et al., "The Impact of Quantum Computing on Present Cryptography," International Journal of Advanced Computer Science and Applications (IJACSA), Mar. 31, 2018, 10 pages, vol. 9, No. 3.

(Continued)

*Primary Examiner* — Don G Zhao
(74) *Attorney, Agent, or Firm* — Ryan, Mason & Lewis, LLP

(57) ABSTRACT

A method includes monitoring an enterprise system to identify cryptographic techniques utilized by one or more components of the enterprise system, the one or more components comprising at least one of physical and virtual computing resources. The method also includes generating one or more profiles characterizing usage of at least a given one of the identified cryptographic techniques by at least a given one of the one or more components of the enterprise system and determining an effect of cryptographic obsolescence of the given identified cryptographic technique on the enterprise system utilizing the generated one or more profiles. The method further includes identifying one or more remedial actions for mitigating the effect of cryptographic obsolescence of the given identified cryptographic technique on the enterprise system and initiating one or more of the identified remedial actions to modify a configuration of one or more components of the enterprise system.

20 Claims, 4 Drawing Sheets

(56) References Cited

U.S. PATENT DOCUMENTS

| | | | | |
|---|---|---|---|---|
| 8,683,052 | B1* | 3/2014 | Brinskelle | H04L 63/1433 709/228 |
| 10,409,995 | B1* | 9/2019 | Wasiq | H04L 63/1433 |
| 10,432,406 | B1* | 10/2019 | Amdahl | H04L 9/0825 |
| 10,454,690 | B1* | 10/2019 | Popoveniuc | H04L 9/30 |
| 2005/0138397 | A1* | 6/2005 | Kusudo | H04N 21/4181 713/188 |
| 2006/0015746 | A1* | 1/2006 | Kusudo | H04N 21/4433 713/187 |
| 2009/0254572 | A1 | 10/2009 | Redlich et al. | |
| 2010/0332820 | A1* | 12/2010 | Matsushima | G06F 21/10 713/150 |
| 2014/0006574 | A1* | 1/2014 | Fischer | H04L 63/20 709/221 |
| 2014/0033305 | A1* | 1/2014 | Nelson | H04L 9/30 726/22 |
| 2015/0143456 | A1* | 5/2015 | Raleigh | H04W 12/088 726/1 |
| 2015/0149390 | A1* | 5/2015 | Brdiczka | G06N 5/02 706/11 |
| 2016/0094560 | A1* | 3/2016 | Stuntebeck | H04L 67/303 726/1 |
| 2017/0249135 | A1* | 8/2017 | Gandhi | G06F 8/654 |
| 2018/0254896 | A1* | 9/2018 | Moysi | H04L 9/3268 |
| 2019/0080108 | A1* | 3/2019 | Gomez Claros | G06F 16/27 |
| 2019/0149564 | A1* | 5/2019 | McLean | H04L 63/1416 713/171 |
| 2019/0166152 | A1* | 5/2019 | Steele | H04L 63/1441 |
| 2019/0207954 | A1* | 7/2019 | Ahuja | H04L 63/0236 |
| 2019/0230065 | A1* | 7/2019 | Panchapakesan | H04L 63/107 |
| 2019/0260595 | A1* | 8/2019 | Walton | H04L 9/3268 |
| 2019/0297065 | A1* | 9/2019 | Kanungo | H04L 63/062 |
| 2020/0053065 | A1* | 2/2020 | Wisniewski | H04L 9/0822 |
| 2020/0076781 | A1* | 3/2020 | Edwards | H04L 63/083 |
| 2020/0099530 | A1* | 3/2020 | Khatib | H04L 9/085 |
| 2020/0137126 | A1* | 4/2020 | Yawalkar | H04L 63/1408 |
| 2020/0201789 | A1* | 6/2020 | Durham | H04L 9/3242 |
| 2020/0266997 | A1* | 8/2020 | Monica | H04L 9/0822 |

OTHER PUBLICATIONS

Ralph Spencer Poore, "Cryptographic Transitions," Information Security Management Handbook, Chapter 79, Apr. 2006, pp. 1029-1037.

Eleanor Mount, "Cryptography, Quantum Computing, and Paths Forward," https://jsis.washington.edu/news/cryptography-encryption-paths-forward/, Feb. 7, 2018, 12 pages.

ETSI, "Quantum Safe Cryptography and Security; An Introduction, Benefits, Enablers and Challenges," White Paper, Quantum Safe Cryptography V1.0.0, Oct. 2014, 49 pages.

* cited by examiner

IDENTIFYING AND MITIGATING RISKS OF CRYPTOGRAPHIC OBSOLESCENCE

FIELD

The field relates generally to information security, and more particularly to detection of security threats.

BACKGROUND

Various entities are subject to different types of security threats. Some security threats relate to networking and computer security for client devices used by members of an entity, such as a business, organization or other enterprise. Security threats include, for example, vulnerabilities in devices in an enterprise system that arise from cryptographic obsolescence of the cryptographic techniques in use, which present risks that can expose the enterprise and its users or devices. As enterprise systems continue to grow in scale, the task of scanning for such vulnerabilities presents various challenges.

SUMMARY

Illustrative embodiments of the present invention provide techniques for identifying and mitigating the risks of cryptographic obsolescence of cryptographic techniques utilized by components of an enterprise system. Embodiments advantageously allow for proactive planning and prioritization of remedial actions for mitigating the risk of cryptographic obsolescence, thereby improving security for enterprise systems.

In one embodiment, a method comprises monitoring an enterprise system to identify cryptographic techniques utilized by one or more components of the enterprise system, the one or more components comprising at least one of physical and virtual computing resources. The method also comprises generating one or more profiles characterizing usage of at least a given one of the identified cryptographic techniques by at least a given one of the one or more components of the enterprise system and determining an effect of cryptographic obsolescence of the given identified cryptographic technique on the enterprise system utilizing the generated one or more profiles. The method further comprises identifying one or more remedial actions for mitigating the effect of cryptographic obsolescence of the given identified cryptographic technique on the enterprise system and initiating one or more of the identified remedial actions to modify a configuration of one or more components of the enterprise system. The method is performed by at least one processing device comprising a processor coupled to a memory.

The processing device may be implemented, for example, in one or more network devices in a computer network, in a security operations center of an enterprise, or in a security analytics system or other type of network security system associated with the computer network or an enterprise.

These and other illustrative embodiments include, without limitation, methods, apparatus, networks, systems and processor-readable storage media.

DETAILED DESCRIPTION

Figure 1:
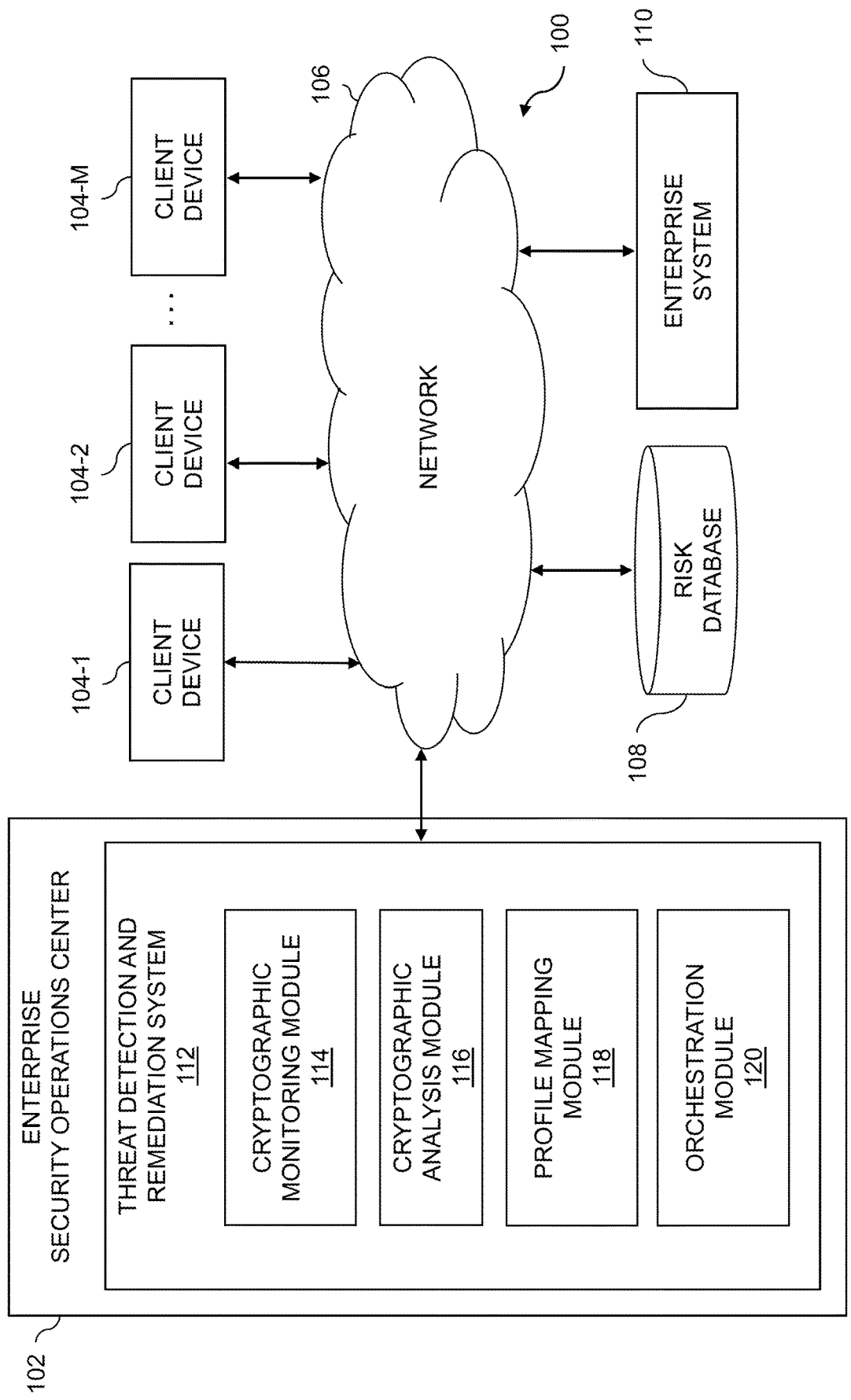
FIG. 1 is a block diagram of an information processing system for identifying and mitigating risks of cryptographic obsolescence in an illustrative embodiment of the invention.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

The impending actualization of quantum computing has brought into focus the danger of obsolescence of existing cryptographic techniques. The term "cryptographic technique" as used herein is intended to be construed broadly, so as to include cryptographic protocols themselves, particular cryptographic algorithms or other implementations of cryptographic protocols, and cryptographic applications which utilize one or more cryptographic protocols and algorithms. The term "cryptographic obsolescence" as used herein is also intended to be construed broadly, so as to include compromise or breaking of a cryptographic technique (e.g., discovery of an exploit or other method which renders a given cryptographic technique unsecure), a change in the difficulty associated with compromise or breaking of a cryptographic technique (e.g., a given cryptographic technique that goes from being secure for a first period of time to being secure for a second, shorter period of time), etc. More generally, cryptographic obsolescence refers to the security of a particular cryptographic technique being below some designated threshold, where the threshold may be designated in terms of a time expected to break or otherwise compromise that cryptographic technique, the amount of computing power required to break or otherwise compromise that cryptographic technique, etc.

While replacement cryptographic techniques are being devised to account for the actualization of quantum computing, existing systems may need to be upgraded. It is difficult, however, for an organization or other enterprise to know what steps should be taken in the event that a particular cryptographic technique is compromised. The enterprise needs to understand what actions are needed, as well as how to prioritize such actions to most expeditiously mitigate risks associated with cryptographic obsolescence. There is accordingly a need for techniques for monitoring, assessing and acting on the risks of cryptographic obsolescence.

Illustrative embodiments provide techniques for monitoring and analyzing an existing system (e.g., an enterprise system) to ascertain the various cryptographic techniques currently in use. This information is then used in conjunction with a risk database to identify what areas of the system should be considered for upgrades or other modification to mitigate the risks associated with cryptographic obsolescence. Further, this information may be utilized by the organization or enterprise to assess its exposure to breakthroughs in cryptanalysis (e.g., with advances in quantum computing representing one known threat) and can be used as input for the management of such risks.

FIG. 1 shows an information processing system 100 configured in accordance with an illustrative embodiment. The information processing system 100 is assumed to be built on at least one processing platform and provides functionality for identifying and mitigating the risks of cryptographic obsolescence of cryptographic techniques that are utilized by components of enterprise system 110, or which are utilized by other entities in communication with components of the enterprise system 110. Components of the enterprise system 110 may include, by way of example, physical and virtual computing resources. Physical computing resources may include physical hardware such as servers, storage systems, networking equipment, Internet of Things (IoT) devices, other types of processing and computing devices, etc. Virtual computing resources may include virtual machines (VMs), containers, etc. Such components may utilize various cryptographic techniques (e.g., cryptographic protocols, algorithms and applications) for securing communications, securing data at rest and data in motion, etc.

In the FIG. 1 embodiment, the system 100 more particularly comprises an enterprise security operations center (SOC) 102 and a plurality of client devices 104-1, 104-2, . . . 104-M, collectively referred to herein as client devices 104. The client devices 104 are coupled to a network 106. Also coupled to the network 106 is a risk database 108, which may store various information relating to vulnerabilities associated with cryptographic techniques and possibly information relating to cryptographic techniques that are utilized by components of the enterprise system 110.

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The risk database 108, as discussed above, is configured to store and record information relating to vulnerabilities associated with cryptographic techniques. Such information may include, by way of example, the projected or expected time at which various cryptographic techniques are expected to become obsolete (e.g., due to advances in cryptanalysis, availability of increased computing power or new types of computing power such as quantum computing, etc.). The information stored in risk database 108 may also characterize the risk of cryptographic obsolescence as it relates to particular usage of various cryptographic techniques. For example, the risk of cryptographic obsolescence may differ for data at rest versus data in motion, based on whether particular communications have forward secrecy, whether the lifetime of cryptographic keys or certificates is less than the time at which such keys or certificates are expected to become cryptographically obsolete, etc. The risk database 108 may further store information relating to the use of cryptographic techniques by components of the enterprise system 110, or by other entities external to the enterprise system 110 that communicate with the components of the enterprise system.

The risk database 108 in some embodiments is implemented using one or more storage systems or devices associated with the enterprise SOC 102. In some embodiments, one or more of the storage systems utilized to implement the risk database 108 comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement a storage system in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the enterprise SOC 102, as well as to support communication between the enterprise SOC 102 and other related systems and devices not explicitly shown.

The client devices 104 are configured to access or otherwise utilize an enterprise system 110. The enterprise system 110 may represent an information technology (IT) infrastructure comprising a plurality of components (e.g., physical or virtual computing resources) of a business, entity or other enterprise. In some embodiments, the enterprise system 110 comprises a data center or collection of data centers, a software-defined data center (SDDC), a cloud computing infrastructure, etc.

In the present embodiment, alerts or notifications generated by a threat detection and remediation system 112 of the enterprise SOC 102 are provided over network 106 to client devices 104, or to a system administrator, information technology (IT) manager, or other authorized personnel via one or more security or host agents. Such security or host agents may be implemented via the client devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 106 with the enterprise SOC 102 and the threat detection and remediation system 112. For example, a given security or host agent may comprise a mobile telephone equipped with a mobile application configured to receive alerts from the enterprise SOC 102 or the threat detection and remediation system 112 and to provide an interface for the security agent to select particular remedial measures for responding to the alert or notification. Examples of such remedial measures may include blocking access by one or more of the client devices 104 to the enterprise system 110, changing or upgrading the cryptographic techniques used by components of the enterprise system 110 (e.g., both internally and for communication with external entities such as client devices 104), triggering further review of the enterprise system 104 or resources thereof (e.g., how cryptographic techniques are being utilized by particular components, as well as the capability and feasibility of implementing actions to mitigate the risks of cryptographic obsolescence thereof), etc.

It should be noted that a "security agent" or "host agent" as these terms are generally used herein may comprise an automated entity, such as a software entity running on a processing device. Accordingly, a security agent or host agent need not be a human entity.

As shown in FIG. 1, the enterprise SOC 102 comprises threat detection and remediation system 112. As will be described in further detail below, the threat detection and remediation system 112 is configured to identify and mitigate risks associated with cryptographic obsolescence of cryptographic techniques utilized by components of the enterprise system 110.

Although shown as an element of the enterprise SOC 102 in this embodiment, the threat detection and remediation system 112 in other embodiments can be implemented at least in part externally to the enterprise SOC 102, for example, as a stand-alone server, set of servers or other type of system coupled to the network 106. In some embodiments, the threat detection and remediation system 112 may be implemented at least in part within one or more of the client devices 104.

The threat detection and remediation system 112 in the FIG. 1 embodiment is assumed to be implemented using at least one processing device. Each such processing device generally comprises at least one processor and an associated memory, and implements one or more functional modules for controlling certain features of the threat detection and remediation system 112. In the FIG. 1 embodiment, the threat detection and remediation system 112 comprises a cryptographic monitoring module 114, a cryptographic analysis module 116, a profile mapping module 118 and an orchestration module 120.

Modern computer systems, data centers and other IT infrastructure of an enterprise system such as enterprise system 110 may contain many components that interact in complex ways. For security and confidentiality, various cryptographic techniques may be used in the enterprise system 110. Due to the advancement of science and technology, it is expected that over time such cryptographic techniques may become obsolete (e.g., weakened or broken). Depending on how such cryptographic techniques are used in the enterprise system 110, this could compromise one or more components of the enterprise system 110 or even the enterprise system 110 as a whole. For example, encrypted data may be made unsafe, digital signatures may become forgeable, etc. The problem is not limited solely to the IT infrastructure that is owned by or is part of the enterprise system 110. Risks may also be associated with the cryptographic techniques used by partner enterprises or other types of devices and entities that interact with and exchange data with the enterprise system 110. Information relating to such risks may be stored in the risk database 108. Illustrative embodiments provide techniques for identifying such risks, and for determining remedial actions to mitigate such risks (e.g., determining changes to IT infrastructure components that should be made when various threats become more likely).

The cryptographic monitoring module 114 is configured to monitor and analyze the enterprise system 110 to determine the cryptographic techniques that are in use within the enterprise system 110. The cryptographic monitoring module 114 is further configured to analyze the cryptographic techniques that are used by client devices 104 that exchange data with the enterprise system 110. The client devices 104 may be devices that are associated with users of the enterprise system 110, partners of the enterprise system 110, other enterprise systems that interact with enterprise system 110, etc.

The cryptographic monitoring module 114, in some embodiments, monitors and analyzes various information that is collected from the enterprise system 110. This may include determining what versions of applications and operating systems are deployed on components of the enterprise system 110 and/or client devices 104, determining which cryptographic libraries are present on the various components of the enterprise system 110 and/or client devices 104, and determining which cryptographic shared library versions are used by the applications running on components of the enterprise system 110 and/or client devices 104 (e.g., which may be determined by interrogating such applications to determine runtime linkages).

For databases and files on components of the enterprise systems 110 and/or client devices 104, the cryptographic monitoring module 114 may search for cryptographic keys stored or otherwise in use. For public and private cryptographic keys, the cryptographic monitoring module 114 is configured to determine their usage. Public keys, for example, are normally encoded as Abstract Syntax Notation One (ASN.1) certificates. Therefore, the cryptographic monitoring module 114 may look at the signing digests being used and their usage (e.g., as specified in the certificate). For any structured data using signatures or encrypting envelopes, the cryptographic monitoring module 114 may extract the specific cryptographic techniques used for such signing or encryption so as to give an indication of how data at rest is being protected. In the case of enveloping and signatures, this may be coming from outside the enterprise system 110, but is still important information as cryptographic obsolescence of such may pose a threat to the enterprise system 110. Data that is encrypted or signed should have metadata contained therein or associated therewith which describes which cryptographic techniques were used to provide such encryption and/or signing. This metadata may be analyzed by the cryptographic monitoring module 114 to reveal the algorithms used, the key sizes used, etc.

The cryptographic monitoring module 114 may also be configured to analyze any log files which indicate cryptographic techniques that are used by components of the enterprise system 110 for external communications. Such external communications may include communication by components of the enterprise system 110 with devices or entities outside the enterprise system 110, communications between different components of the enterprise system 110, etc.

The cryptographic monitoring module 114 may also look for any signed objects. For code signing, as an example, the cryptographic monitoring module 114 may record the signature algorithm used, the hash algorithm used, etc.

For network traffic (e.g., between client devices 104 and enterprise system 110 over network 106), cipher suites are negotiated, often in an initial clear text exchange. The cryptographic monitoring module 114 may use this information to determine which cryptographic techniques are used in the network traffic.

It should be noted again that in some embodiments the cryptographic monitoring module 114 monitors not only the enterprise system 110, but also third parties (e.g., client devices 104) that are in communication with the enterprise system 110. While the enterprise system 110 may, for example, specify a preference for a particular (e.g., modern) cryptographic technique, backward compatibility requirements may result in superseded cryptographic techniques being used in communication between such third parties and the enterprise system 110.

The cryptographic monitoring module 114, in some embodiments, is also configured to identify the cryptographic techniques that are used by third-party cloud providers. For example, with Infrastructure-as-a-Service (IaaS) providers, the cryptographic monitoring module 114 may obtain such information from a certificate. For Software-as-a-Service (SaaS) providers, the cryptographic monitoring module 114 may need to look up what such providers do in various ways.

In some cases, the cryptographic monitoring module 114 is configured to check that a particular cryptographic technique is being used whenever feasible. If a third-party, for example, indicates that it is using Advanced Encryption Standard (AES) and shares a key with the cryptographic monitoring module 114, the cryptographic monitoring module 114 may independently encrypt the same data to check that AES is, in fact, being used.

Third-party cloud providers often provide customer-facing interfaces to hosted applications. The cryptographic monitoring module 114 may be configured to access such applications via the customer-facing interfaces to obtain information about the cryptographic techniques used to protect the hosted applications.

Once gathered, the information relating to the cryptographic techniques being used by the enterprise system 110 and entities exchanging data with the enterprise system (e.g., client devices 104) is provided from the cryptographic monitoring module 114 to the cryptographic analysis module 116. The collected information is utilized by the cryptographic analysis module 116 for analysis and planning, which may be proactive, reactive, on-demand, when computing resources are available, etc. There are various ways that the collected information may be organized by the cryptographic analysis module 116. In some embodiments, the collected information may be organized as a list, table, database, etc. of where particular cryptographic techniques are used within the enterprise system 110 or within a partner organization or other entity that exchanges data with one or more components or assets within the enterprise system 110. The collected information may also mark which components or assets within the enterprise system 110, and/or which components or assets associated with third parties exchanging data with the enterprise system 110, are broken, deprecated or otherwise obsolete.

The cryptographic analysis module 116, in some embodiments, is configured to classify different cryptographic techniques and their use as it relates to the enterprise system 110. Some cryptographic techniques, for example, may be considered safe for use in some circumstances but not others. If the usage of a particular cryptographic technique is available from the collected information, this may be used by the cryptographic analysis module 116 to sub-classify usage in specific use cases. Consider, by way of example, systems that utilize ephemeral keys. If the keys can be compromised in real time, data could be modified. If the keys can only be compromised after a week of computation, the system could reveal data but it cannot be modified. For some situations, this may not be considered critical. As another example, consider forward secrecy. Some uses of cryptographic techniques will compromise all past encrypted sessions if the key is recovered. For systems and applications with forward secrecy, however, only individual sessions could be decrypted.

The cryptographic analysis module 116 is configured, in some embodiments, to store information relating to the classification of cryptographic techniques in use by the enterprise system 110 (and by entities such as client devices 104 that exchange data with the enterprise system 110) in a database. In some embodiments, such information is stored in the risk database 108. In other embodiments, however, such information may be stored in memory, in a separate database, etc.

The profile mapping module 118 is configured to map the information relating to the deployed cryptographic techniques for enterprise system 110 to one or more cryptographic profiles. Based on these cryptographic profiles, the profile mapping module 118 can make recommendations for orchestration actions to be initiated to mitigate risks associated with cryptographic obsolescence. When cryptographic techniques undergo changes in status (e.g., as identified in the risk database 108 or some other knowledge store), the profile mapping module 118 can identify the components of the enterprise system 110 affected by this change and make recommendations for remedial actions to be taken to address such changes.

Consider, for example, a particular cryptographic technique that changes from being secure for 30 years to only being secure for 5 years (e.g., due to advances in cryptanalysis). The profile mapping module 118 can identify this change in status based on new or updated information in the risk database 108, or via a notification from some other knowledge store, and determine which components of the enterprise system 110 are affected by this change in status.

The profile mapping module 118 may be further configured to determine weightings for different components of the enterprise system 110 (e.g., such as based on the relative importance of assets in the enterprise system 110, the risk posed by exposure or compromise of different components or assets in the enterprise system 110, etc.). These weightings may be used to prioritize resource allocation for performing remedial actions to address the affected components of the enterprise system 110. This resource allocation may include determining where to prioritize hardware upgrades, how to utilize available compute, storage and networking resources to apply upgrades or changes in configuration of components within the enterprise system 110 (e.g., resources to allocate to update software or apply security hardening procedures to potentially affected components of the enterprise system 110), how to utilize available compute, storage and networking resources to update or replace cryptographic keys, seeds or other information to strengthen or mitigate the risks posed by cryptographic obsolescence (e.g., resources to allocate to computing 4096-bit keys to replace 2048-bit keys), etc.

The profile mapping module 118, in some embodiments, provides functionality for risk management and planning with respect to cryptographic obsolescence affecting the enterprise system 110. Various hypothetical scenarios may be modeled to determine the impact of changes in the risk associated with cryptographic techniques used by components of the enterprise system 110. As one example, the profile mapping module 118 may model how the enterprise system 110 would be affected by the availability of quantum computers able to break RSA 2048-bit code signing keys. The profile mapping module 118 is configured to determine which components of the enterprise system 110 would be affected in this scenario. If the enterprise system 110, for example, were using RSA 4096-bit code signing keys, the profile mapping module 118 may determine that such keys would not need to be updated for a year or two, and thus apply an appropriate weighting to the risk associated with use of RSA 4096-bit code signing keys.

In some cases, the profile mapping module 118 may determine that no immediate action is necessary. For example, if current RSA 2048-bit certificates are due to expire within the next year, there may be no need to proactively re-compute and re-issue such certificates. Instead, the profile mapping module 118 may simple initiate remedial action in that, when such certificates do expire, their replacements utilize 4096-bit keys or use post-quantum (PQ) cryptographic techniques not affected by the availability of quantum computers that are able to break RSA 2048-bit keys. The profile mapping module 118 is configured to determine what other components of the enterprise system 110 may be affected by the move to PQ cryptographic techniques for signing, and then make decisions regarding upgrading and updating such components to prepare for the move to PQ cryptographic techniques.

The profile mapping module 118, in some embodiments, further provides an ability for a user (e.g., a user of one of the client devices 104) to query the threat detection and remediation system 112 to determine the impact on enterprise system 110 resulting from various theoretic attacks against cryptographic techniques. This can allow users to explore the potential impact of different threats, which is useful as such threats regularly occur due to continued advances in cryptanalysis. The profile mapping module 118 may expose an application programming interface (API) that allows the user to submit such theoretic attacks and to receive reports regarding the potential impact on enterprise system 110. The profile mapping module 118, via this API, may further provide the querying user or device with a list of potential remedial actions and their resource cost for mitigating the risks posed by such theoretic attacks. The user or device may select one or more of such actions to be implemented for the enterprise system 110 utilizing the orchestration module 120.

The profile mapping module 118 may also be configured to determine what cryptographic techniques are being used to protect critical assets in the enterprise system 110. In some cases, data must comply with various regulations (e.g., Health Insurance Portability and Accountability Act (HIPAA) regulations). A user may desire to know which components of the enterprise system 110, if compromised (e.g., through cryptographic obsolescence), would lead to liabilities in relation to such regulations.

Given the scope of use of a particular cryptographic technique, the profile mapping module 118 is configured to generate an indication of the scope of mitigation work or remedial action recommended. If a symmetric key length, for example, should be doubled, this is a simpler undertaking compared to changing to a completely different public key signature system (e.g., which may require keys in the range of 40 kilobytes versus an existing 1 kilobyte key). In this case of a much larger public key, the profile mapping module 118 may be configured to provide a list or other indication of the components in the enterprise system 110 that need to be converted and tested. This may involve, for example, checking that all places where the larger public keys are to be stored have room to manage the larger keys, and available computing resources for computing such larger public keys. Of course, this is in addition to the checks required to determine the impact of changing over to a new public key signature system (e.g., to using a new or different signature algorithm). The profile mapping module 118 is also configured to determine key managers and any components of the enterprise system 110 handling certificates that may also be affected.

The orchestration module 120, as discussed above, is configured to implement remedial actions to mitigate risks of cryptographic obsolescence that are determined by the profile mapping module 118. In some embodiments, recommended remedial actions are automatically implemented by the orchestration module 120. In other embodiments, recommended remedial actions may be presented to a user (e.g., via a security or host agent as noted above) that selects which actions to implement via the orchestration module 120. In still other embodiments, combinations of these approaches may be used. For example, the orchestration module 120 may be configured to automatically implement remedial actions that have a weighting above some designated threshold (e.g., where the weighting indicates the urgency of such actions for mitigating certain cryptographic obsolescence risks), while waiting to implement remedial actions with a weighting below the designated threshold until receiving user approval. Still further, the orchestration module 120 may be configured to use the weightings to prioritize different remedial actions, and to take remedial actions in accordance with this prioritization based on resource availability within the enterprise system 110.

It is to be appreciated that the particular arrangement of the enterprise SOC 102, threat detection and remediation system 112, cryptographic monitoring module 114, cryptographic analysis module 116, profile mapping module 118 and orchestration module 120 illustrated in the FIG. 1 embodiment is presented by way of example only, and alternative arrangements can be used in other embodiments. As discussed above, for example, the enterprise SOC 102, threat detection and remediation system 112, cryptographic monitoring module 114, cryptographic analysis module 116, profile mapping module 118 and orchestration module 120 may in some embodiments be implemented internal to one or more of the client devices 104 or enterprise system 110. As another example, the functionality associated with the cryptographic monitoring module 114, cryptographic analysis module 116, profile mapping module 118 and orchestration module 120 may be combined into one module, or separated across more than four modules with the multiple modules possibly being implemented with multiple distinct processors or processing devices.

At least portions of the cryptographic monitoring module 114, cryptographic analysis module 116, profile mapping module 118 and orchestration module 120 may be implemented at least in part in the form of software that is stored in memory and executed by a processor.

It is to be understood that the particular set of elements shown in FIG. 1 for identifying and mitigating risks of cryptographic obsolescence of cryptographic techniques utilized by components of the enterprise system 110 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the threat detection and remediation system 112 may be implemented external to enterprise SOC 102, such that the enterprise SOC 102 can be eliminated.

In some embodiments, the threat detection and remediation system 112 may be part of or otherwise associated with a system other than the enterprise SOC 102, such as, for example, a critical incident response center (CIRC), a security analytics system, a security information and event management (SIEM) system, a Governance, Risk and Compliance (GRC) system, etc.

The threat detection and remediation system 112 and other portions of the system 100, as will be described in further detail below, may be part of cloud infrastructure such as an Amazon Web Services (AWS) system. Other examples of cloud-based systems that can be used to provide the threat detection and remediation system 112 include Virtustream Enterprise Cloud, Virtustream Storage Cloud, Google Cloud Platform (GCP) and Microsoft Azure.

The threat detection and remediation system 112 and other components of the information processing system 100 in the FIG. 1 embodiment are assumed to be implemented using at least one processing platform each comprising one or more processing devices each having a processor coupled to a memory. Such processing devices can illustratively include particular arrangements of compute, storage and network resources.

The client devices 104 and threat detection and remediation system 112 or components thereof (e.g., cryptographic monitoring module 114, cryptographic analysis module 116, profile mapping module 118 and orchestration module 120) may be implemented on respective distinct processing platforms, although numerous other arrangements are possible. For example, in some embodiments at least portions of the threat detection and remediation system 112 and one or more of the client devices 104 are implemented on the same processing platform. A given client device (e.g., 104-1) can therefore be implemented at least in part within at least one processing platform that implements at least a portion of the threat detection and remediation system 112.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the client devices 104, threat detection and remediation system 112 or portions or components thereof, to reside in different data centers. Numerous other distributed implementations are possible. The threat detection and remediation system 112 can also be implemented in a distributed manner across multiple data centers.

Additional examples of processing platforms utilized to implement threat detection and remediation system 112 in illustrative embodiments will be described in more detail below in conjunction with FIGS. 3 and 4.

It is to be appreciated that these and other features of illustrative embodiments are presented by way of example only, and should not be construed as limiting in any way.

Figure 2:
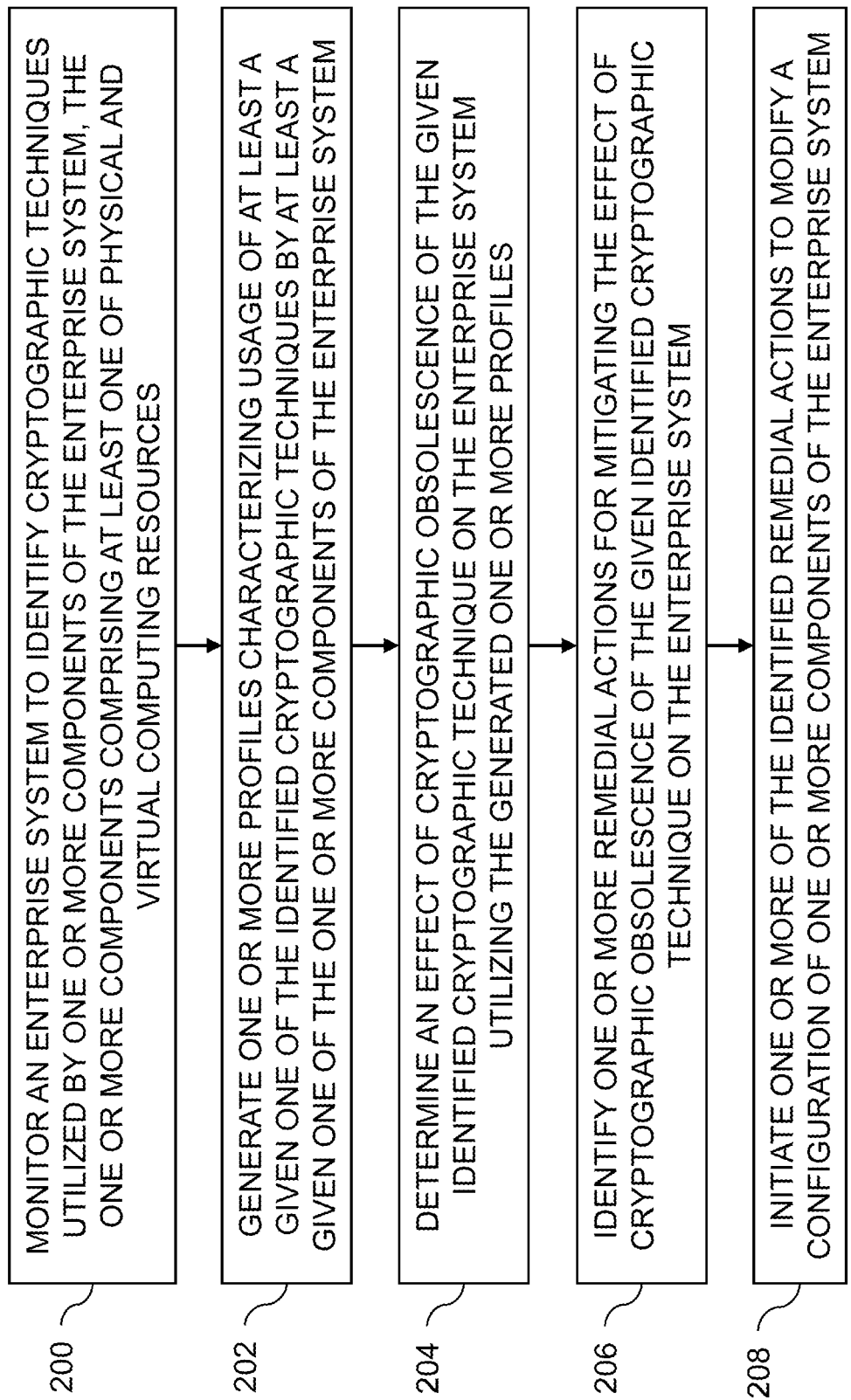
FIG. 2 is a flow diagram of an exemplary process for identifying and mitigating risks of cryptographic obsolescence in an illustrative embodiment.

An exemplary process for identifying and mitigating risks of cryptographic obsolescence will now be described in more detail with reference to the flow diagram of FIG. 2. It is to be understood that this particular process is only an example, and that additional or alternative processes for identifying and mitigating the risks of cryptographic obsolescence can be carried out in other embodiments.

In this embodiment, the process includes steps 200 through 208. These steps are assumed to be performed by the threat detection and remediation system 112 utilizing the cryptographic monitoring module 114, cryptographic analysis module 116, profile mapping module 118 and orchestration module 120.

The process begins with step 200, monitoring an enterprise system to identify cryptographic techniques utilized by one or more components of the enterprise system. The components of the enterprise system may comprise physical and virtual computing resources of an IT infrastructure. Step 200 may include identifying one or more applications and operating systems deployed on the components of the enterprise system. Step 200 may further include identifying cryptographic libraries stored on the components of the enterprise system, identifying cryptographic shared library versions utilized by the identified applications and operating systems deployed on the components of the enterprise system, searching data items stored on the components of the enterprise system to identify one or more cryptographic keys and digitally signed data items, analyzing the identified cryptographic keys and digitally signed data items to identify usage of cryptographic techniques by the identified applications and operating systems deployed on the components of the enterprise system, etc. Step 200 may also or alternatively include analyzing log files to determine cryptographic techniques utilized for communication between one or more components of the enterprise system and one or more entities external to the enterprise system, monitoring network traffic to identify negotiation of one or more cryptographic techniques utilized for communication between one or more components of the enterprise system and one or entities external to the enterprise system, identifying one or more third-party cloud service providers providing interfaces to one or more hosted applications accessed by one or more components of the enterprise system and accessing the interfaces to identify cryptographic techniques used to protect the one or more hosted applications, etc.

In step 202, one or more profiles characterizing usage of at least a given one of the identified cryptographic techniques by at least a given one of the one or more components of the enterprise system are generated. Step 202 may involve, for example, classifying usage of the cryptographic techniques by particular components in the enterprise system and possibly sub-classifying usage in particular use cases scenarios that may affect risk of cryptographic obsolescence as described elsewhere herein. This information may be used to map the deployed cryptographic techniques in the enterprise system onto the profiles generated in step 202.

The process continues with step 204, determining an effect of cryptographic obsolescence of the given identified cryptographic technique on the enterprise system utilizing the generated one or more profiles. In some embodiments, step 204 is performed responsive to detecting that the given identified cryptographic technique has undergone a change in status associated with vulnerability of the given identified cryptographic technique (e.g., that a particular cryptographic technique has been compromised or rendered unsecure due to advances in cryptanalysis, increases in available computing power such as availability of quantum computers, etc.). In other embodiments, step 204 may be performed responsive to receiving a user query specifying a hypothetical change in status associated with vulnerability of the given identified cryptographic technique. Thus, step 204 may be performed to allow users to model how the enterprise system would be affected by the given identified cryptographic technique becoming obsolete or otherwise compromised.

In some embodiments, step 204 may include assigning a weighting for prioritizing remedial actions to mitigate the risk of cryptographic obsolescence of the given identified cryptographic technique relative to remedial actions for mitigating the risk of cryptographic obsolescence of at least one other one of the identified cryptographic techniques. Assigning the weighting may be based on a variety of factors and consideration. In some embodiments, assigning the weighting includes identifying a first set of components of the enterprise system affected by cryptographic obsolescence of the given identified cryptographic technique, identifying a second set of components of the enterprise system affected by cryptographic obsolescence of the at least one other one of the identified cryptographic techniques, and assigning the weighting based at least in part on relative importance of the first set of components and the second set of components in the enterprise system. In other embodiments, assigning the weighting may also or alternatively include identifying a first time at which the given identified cryptographic technique is projected to be cryptographically obsolete, identifying a second time at which the at least one other one of the identified cryptographic techniques is projected to be cryptographically obsolete, and assigning the weighting based at least in part on a comparison of the first time and the second time. In other embodiments, assigning the weighting may also or alternatively include identifying a first amount of resources required for implementing the remedial actions for mitigating the risk associated with cryptographic obsolescence of the given identified cryptographic technique, identifying a second amount of resources required for implementing the remedial actions for mitigating the risk associated with cryptographic obsolescence of the at least one other one of the identified cryptographic techniques, and assigning the weighting based at least in part on a comparison of the first amount of resources and the second amount of resources.

It should be appreciated that the weighting may be assigned based on combinations of these and other factors, including user-defined weightings, weighting to prioritize applying remedial actions to different components affected by cryptographic obsolescence of the same cryptographic techniques (e.g., prioritizing remedial actions for assets or components in the enterprise system based on relative importance thereof, based on available resources, etc.), to comply with legal obligations or other regulatory-related risk, dependencies between components of the enterprise system, etc.

In step 206, one or more remedial actions for mitigating the effect of cryptographic obsolescence of the given identified cryptographic technique on the enterprise system are identified. One or more of the identified remedial actions are initiated in step 208 to modify a configuration of one or more components of the enterprise system. It should be noted that cryptographic obsolescence need not be immediate for step 208 to be performed. For example, the remedial actions may be initiated in step 208 so as to proactively plan for expected changes in the status of cryptographic techniques (e.g., determining that a cryptographic technique thought to be secure for a first period of time is now only expected to be secure for a second, shorter period of time). The remedial actions may also be initiated in step 208 in response to determining that there are available computing resources (e.g., processing, memory, storage, networking) available for applying security hardening procedures to mitigate risks associated with cryptographic obsolescence.

Modifying the configuration of one or more components of the enterprise system, in some embodiments, comprises switching from utilizing a first key length for the given identified cryptographic technique to utilizing a second key length for the given identified cryptographic technique, the second key length being longer than the first key length. In other embodiments, modifying the configuration of one or more components of the enterprise system also or alternatively comprises switching from utilizing the given identified cryptographic technique for one or more applications running on at least one component of the enterprise system to utilizing a different cryptographic technique in place of the given identified cryptographic technique for the one or more applications running on the at least one component of the enterprise system. Various other types of modification may be made in other embodiments, including blocking access to certain components of the enterprise system (e.g., by client device or other entities that utilize compromised or obsolete cryptographic techniques), sandboxing communications with and between components of the enterprise system that utilize compromised or obsolete cryptographic techniques, upgrading hardware or software used in the enterprise system, etc.

Illustrative embodiments advantageously provide the ability to determine the use of cryptographic techniques by an enterprise system (as well as other entities that exchange data with the enterprise system), as well dependencies between them. This information is used to plan responses to predicted or actual failure (e.g., cryptographic obsolescence) of components in the enterprise system.

Embodiments may proactively plan for changes and provide reports on the risk associated with different cryptographic techniques becoming obsolete, allowing users to determine the threats posed to the enterprise system. The exact change and its timing (e.g., when a particular threat is actualized, such as when quantum computing becomes available to render various cryptographic techniques obsolete) may not be known, but embodiments are still able to plan for such events and proactively apply security hardening procedures to the enterprise system to mitigate such risks.

Embodiments also provide the ability to collate information on interactions with third parties outside the enterprise system, so as to evaluate and quantify associated exposure (e.g., resulting from providing backward compatibility for interactions between such third parties and components of the enterprise system).

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for identifying and mitigating risks of cryptographic obsolescence will now be described in greater detail with reference to FIGS. 3 and 4. Although described in the context of system 100, these platforms may also be used to implement at least portions of other information processing systems in other embodiments.

Figure 3:
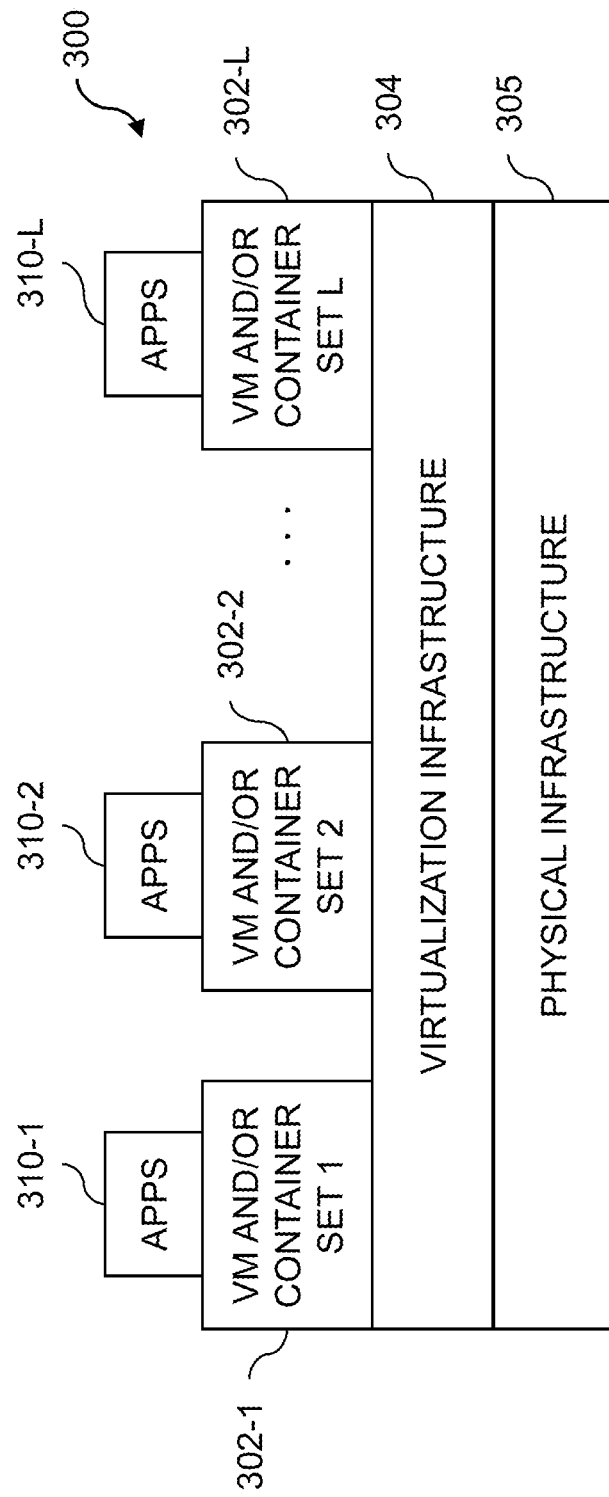
FIGS. 3 and 4 show examples of processing platforms that may be utilized to implement at least a portion of an information processing system in illustrative embodiments.
Figure 4:
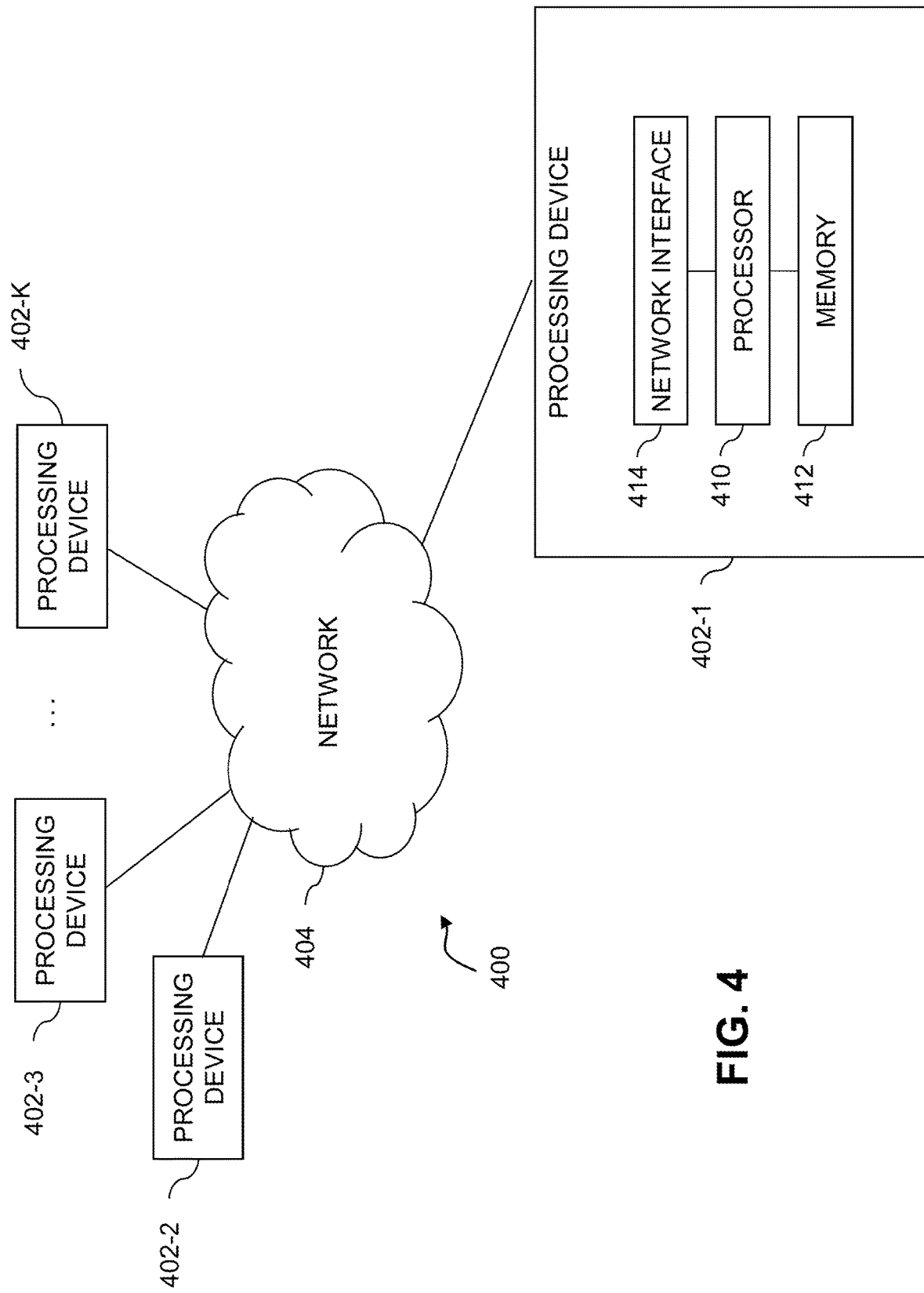

FIG. 3 shows an example processing platform comprising cloud infrastructure 300. The cloud infrastructure 300 comprises a combination of physical and virtual processing resources that may be utilized to implement at least a portion of the information processing system 100. The cloud infrastructure 300 comprises multiple virtual machines (VMs) and/or container sets 302-1, 302-2, ... 302-L implemented using virtualization infrastructure 304. The virtualization infrastructure 304 runs on physical infrastructure 305, and illustratively comprises one or more hypervisors and/or operating system level virtualization infrastructure. The operating system level virtualization infrastructure illustratively comprises kernel control groups of a Linux operating system or other type of operating system.

The cloud infrastructure 300 further comprises sets of applications 310-1, 310-2, ... 310-L running on respective ones of the VMs/container sets 302-1, 302-2, ... 302-L under the control of the virtualization infrastructure 304. The VMs/container sets 302 may comprise respective VMs, respective sets of one or more containers, or respective sets of one or more containers running in VMs.

In some implementations of the FIG. 3 embodiment, the VMs/container sets 302 comprise respective VMs implemented using virtualization infrastructure 304 that comprises at least one hypervisor. An example of a hypervisor platform that may be used to implement a hypervisor within the virtualization infrastructure 304 is the VMware® vSphere® which may have an associated virtual infrastructure management system such as the VMware® vCenter™. The underlying physical machines may comprise one or more distributed processing platforms that include one or more storage systems.

In other implementations of the FIG. 3 embodiment, the VMs/container sets 302 comprise respective containers implemented using virtualization infrastructure 304 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

The processing platform 400 in this embodiment comprises a portion of system 100 and includes a plurality of processing devices, denoted 402-1, 402-2, 402-3, ... 402-K, which communicate with one another over a network 404.

The network 404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 402-1 in the processing platform 400 comprises a processor 410 coupled to a memory 412.

The processor 410 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 412 may comprise random access memory (RAM), read-only memory (ROM), flash memory or other types of memory, in any combination. The memory 412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for identifying and mitigating the risks of cryptographic obsolescence as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, components, cryptographic techniques, remedial actions, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
    monitoring an enterprise system to identify cryptographic techniques utilized by one or more components of the enterprise system, the one or more components comprising at least one of physical and virtual computing resources;
    generating one or more profiles characterizing usage of at least one of the identified cryptographic techniques by at least one of the one or more components of the enterprise system;
    determining an effect of cryptographic obsolescence of said at least one of the identified cryptographic techniques on the enterprise system utilizing the generated one or more profiles, wherein cryptographic obsolescence of said at least one of the identified cryptographic techniques comprises at least one of (i) a change in a time expected to at least one of break and compromise said at least one of the identified cryptographic techniques and (ii) a change in computing power required to at least one of break and compromise said at least one of the identified cryptographic techniques;
    identifying one or more remedial actions for mitigating the effect of cryptographic obsolescence of said at least one of the identified cryptographic techniques on the enterprise system; and
    initiating one or more of the identified remedial actions to modify a configuration of one or more components of the enterprise system;
    wherein the method is performed by at least one processing device comprising a processor coupled to a memory.

2. The method of claim 1 wherein monitoring the enterprise system to identify the cryptographic techniques comprises identifying one or more applications and operating systems deployed on the components of the enterprise system.

3. The method of claim 2 wherein monitoring the enterprise system to identify the cryptographic techniques further comprises:
    identifying cryptographic libraries stored on the components of the enterprise system; and
    identifying cryptographic shared library versions utilized by the identified applications and operating systems deployed on the components of the enterprise system.

4. The method of claim 2 wherein monitoring the enterprise system to identify the cryptographic techniques further comprises:
    searching data items stored on the components of the enterprise system to identify one or more cryptographic keys and digitally signed data items; and
    analyzing the identified cryptographic keys and digitally signed data items to identify usage of the identified cryptographic techniques by the identified applications and operating systems deployed on the components of the enterprise system.

5. The method of claim 1 wherein monitoring the enterprise system to identify the cryptographic techniques comprises:
    analyzing log files to determine one or more of the identified cryptographic techniques utilized for communication between one or more components of the enterprise system and one or more entities external to the enterprise system; and
    monitoring network traffic to identify negotiation of one or more of the identified cryptographic techniques utilized for communication between one or more components of the enterprise system and one or entities external to the enterprise system.

6. The method of claim 1 wherein monitoring the enterprise system to identify the cryptographic techniques comprises:
    identifying one or more third-party cloud service providers providing interfaces to one or more hosted applications accessed by one or more components of the enterprise system; and
    accessing the interfaces to determine one or more of the identified cryptographic techniques used to protect the one or more hosted applications.

7. The method of claim 1 wherein determining the effect of cryptographic obsolescence of said at least one of the identified cryptographic techniques on the enterprise system utilizing the generated one or more profiles is performed responsive to detecting that said at least one of the identified cryptographic techniques has undergone a change in status associated with vulnerability of said at least one of the identified cryptographic techniques.

8. The method of claim 1 wherein determining the effect of cryptographic obsolescence of said at least one of the identified cryptographic techniques on the enterprise system utilizing the generated one or more profiles is performed responsive to receiving a user query specifying a hypothetical change in status associated with vulnerability of said at least one of the identified cryptographic techniques.

9. The method of claim 1 wherein determining the effect of cryptographic obsolescence of said at least one of the identified cryptographic techniques on the enterprise system utilizing the generated one or more profiles comprises:
    assigning weights for prioritizing remedial actions to mitigate the risk of cryptographic obsolescence of said at least one of the identified cryptographic techniques relative to remedial actions for mitigating the risk of cryptographic obsolescence of at least one other one of the identified cryptographic techniques.

10. The method of claim 9 wherein assigning the weights comprises:
    identifying a first set of components of the enterprise system affected by cryptographic obsolescence of said at least one of the identified cryptographic techniques;

identifying a second set of components of the enterprise system affected by cryptographic obsolescence of said at least one other one of the identified cryptographic techniques; and assigning the weights based at least in part on relative importance of the first set of components and the second set of components in the enterprise system.

11. The method of claim 9 wherein assigning the weights comprises:

identifying a first time at which said at least one of the identified cryptographic techniques is projected to be cryptographically obsolete;

identifying a second time at which said at least one other one of the identified cryptographic techniques is projected to be cryptographically obsolete; and assigning the weights based at least in part on a comparison of the first time and the second time.

12. The method of claim 9 wherein assigning the weights comprises:

identifying a first amount of resources required for implementing the remedial actions for mitigating the risk associated with cryptographic obsolescence of said at least one of the identified cryptographic techniques;

identifying a second amount of resources required for implementing the remedial actions for mitigating the risk associated with cryptographic obsolescence of said at least one other one of the identified cryptographic techniques; and assigning the weights based at least in part on a comparison of the first amount of resources and the second amount of resources.

13. The method of claim 1 wherein modifying the configuration of one or more components of the enterprise system comprises switching from utilizing a first key length for said at least one of the identified cryptographic techniques to utilizing a second key length for said at least one of the identified cryptographic techniques, the second key length being longer than the first key length.

14. The method of claim 1 wherein modifying the configuration of one or more components of the enterprise system comprises switching from utilizing said at least one of the identified cryptographic techniques for one or more applications running on at least one component of the enterprise system to utilizing a different cryptographic technique in place of said at least one of the identified cryptographic techniques for the one or more applications running on the at least one component of the enterprise system.

15. A computer program product comprising a non-transitory processor-readable storage medium having stored therein program code of one or more software programs, wherein the program code when executed by at least one processing device causes the at least one processing device:

to monitor an enterprise system to identify cryptographic techniques utilized by one or more components of the enterprise system, the one or more components comprising at least one of physical and virtual computing resources;

to generate one or more profiles characterizing usage of at least one of the identified cryptographic techniques by at least one of the one or more components of the enterprise system;

to determine an effect of cryptographic obsolescence of said at least one of the identified cryptographic techniques on the enterprise system utilizing the generated one or more profiles, wherein cryptographic obsolescence of said at least one of the identified cryptographic techniques comprises at least one of (i) a change in a time expected to at least one of break and compromise said at least one of the identified cryptographic techniques and (ii) a change in computing power required to at least one of break and compromise said at least one of the identified cryptographic techniques;

to identify one or more remedial actions for mitigating the effect of cryptographic obsolescence of said at least one of the identified cryptographic techniques on the enterprise system; and to initiate one or more of the identified remedial actions to modify a configuration of one or more components of the enterprise system.

16. The computer program product of claim 15 wherein determining the effect of cryptographic obsolescence of said at least one of the identified cryptographic techniques on the enterprise system utilizing the generated one or more profiles comprises:

assigning weights for prioritizing remedial actions to mitigate the risk of cryptographic obsolescence of said at least one of the identified cryptographic techniques relative to remedial actions for mitigating the risk of cryptographic obsolescence of at least one other one of the identified cryptographic techniques.

17. The computer program product of claim 16 wherein assigning the weights is based at least in part on one or more of:

a relative importance of a first set of components of the enterprise system affected by cryptographic obsolescence of said at least one of the identified cryptographic techniques and a second set of components of the enterprise system affected by cryptographic obsolescence of said at least one other one of the identified cryptographic techniques;

a comparison of a first time at which said at least one of the identified cryptographic techniques is projected to be cryptographically obsolete and a second time at which said at least one other one of the identified cryptographic techniques is projected to be cryptographically obsolete; and a comparison of a first amount of resources required for implementing the remedial actions for mitigating the risk associated with cryptographic obsolescence of said at least one of the identified cryptographic techniques and a second amount of resources required for implementing the remedial actions for mitigating the risk associated with cryptographic obsolescence of said at least one other one of the identified cryptographic techniques.

18. An apparatus comprising:

at least one processing device comprising a processor coupled to a memory;

the at least one processing device being configured:

to monitor an enterprise system to identify cryptographic techniques utilized by one or more components of the enterprise system, the one or more components comprising at least one of physical and virtual computing resources;

to generate one or more profiles characterizing usage of at least one of the identified cryptographic techniques by at least one of the one or more components of the enterprise system;

to determine an effect of cryptographic obsolescence of said at least one of the identified cryptographic techniques on the enterprise system utilizing the generated one or more profiles, wherein cryptographic obsolescence of said at least one of the identified cryptographic techniques comprises at least one of (i) a change in a time expected to at least one of break and compromise said at least one of the identified cryptographic techniques and (ii) a change in computing power required to at least one of break and compromise said at least one of the identified cryptographic techniques;

to identify one or more remedial actions for mitigating the effect of cryptographic obsolescence of said at least one of the identified cryptographic techniques on the enterprise system; and to initiate one or more of the identified remedial actions to modify a configuration of one or more components of the enterprise system.

19. The apparatus of claim 18 wherein determining the effect of cryptographic obsolescence of said at least one of the identified cryptographic techniques on the enterprise system utilizing the generated one or more profiles comprises:

assigning weights for prioritizing remedial actions to mitigate the risk of cryptographic obsolescence of said at least one of the identified cryptographic techniques relative to remedial actions for mitigating the risk of cryptographic obsolescence of at least one other one of the identified cryptographic techniques.

20. The apparatus of claim 19 wherein assigning the weights is based at least in part on one or more of:

a relative importance of a first set of components of the enterprise system affected by cryptographic obsolescence of said at least one of the identified cryptographic techniques and a second set of components of the enterprise system affected by cryptographic obsolescence of said at least one other one of the identified cryptographic techniques;

a comparison of a first time at which said at least one of the identified cryptographic techniques is projected to be cryptographically obsolete and a second time at which said at least one other one of the identified cryptographic techniques is projected to be cryptographically obsolete; and a comparison of a first amount of resources required for implementing the remedial actions for mitigating the risk associated with cryptographic obsolescence of said at least one of the identified cryptographic techniques and a second amount of resources required for implementing the remedial actions for mitigating the risk associated with cryptographic obsolescence of said at least one other one of the identified cryptographic techniques.

* * * * *